Figure 4:
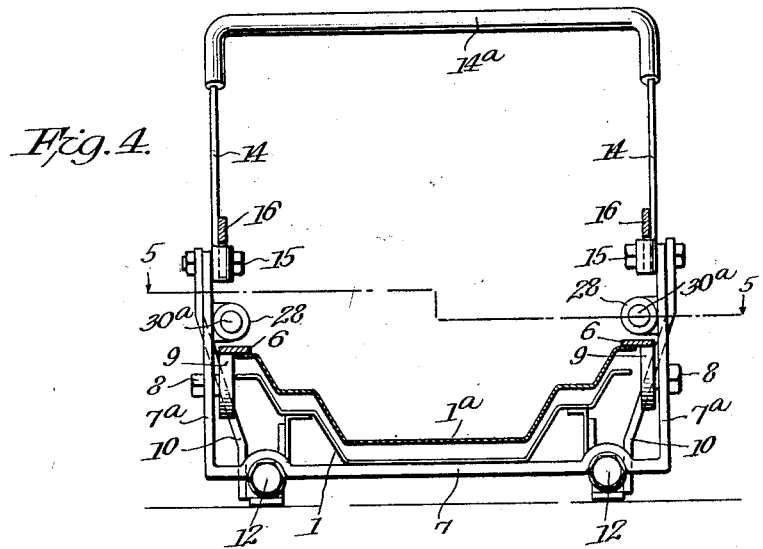

March 22, 1932. G. H. ERNSBARGER 1,850,582
RECIPROCATING OR JIGGING CONVEYER AND LOADER THEREFOR
Original Filed Feb. 15, 1928 5 Sheets-Sheet 1
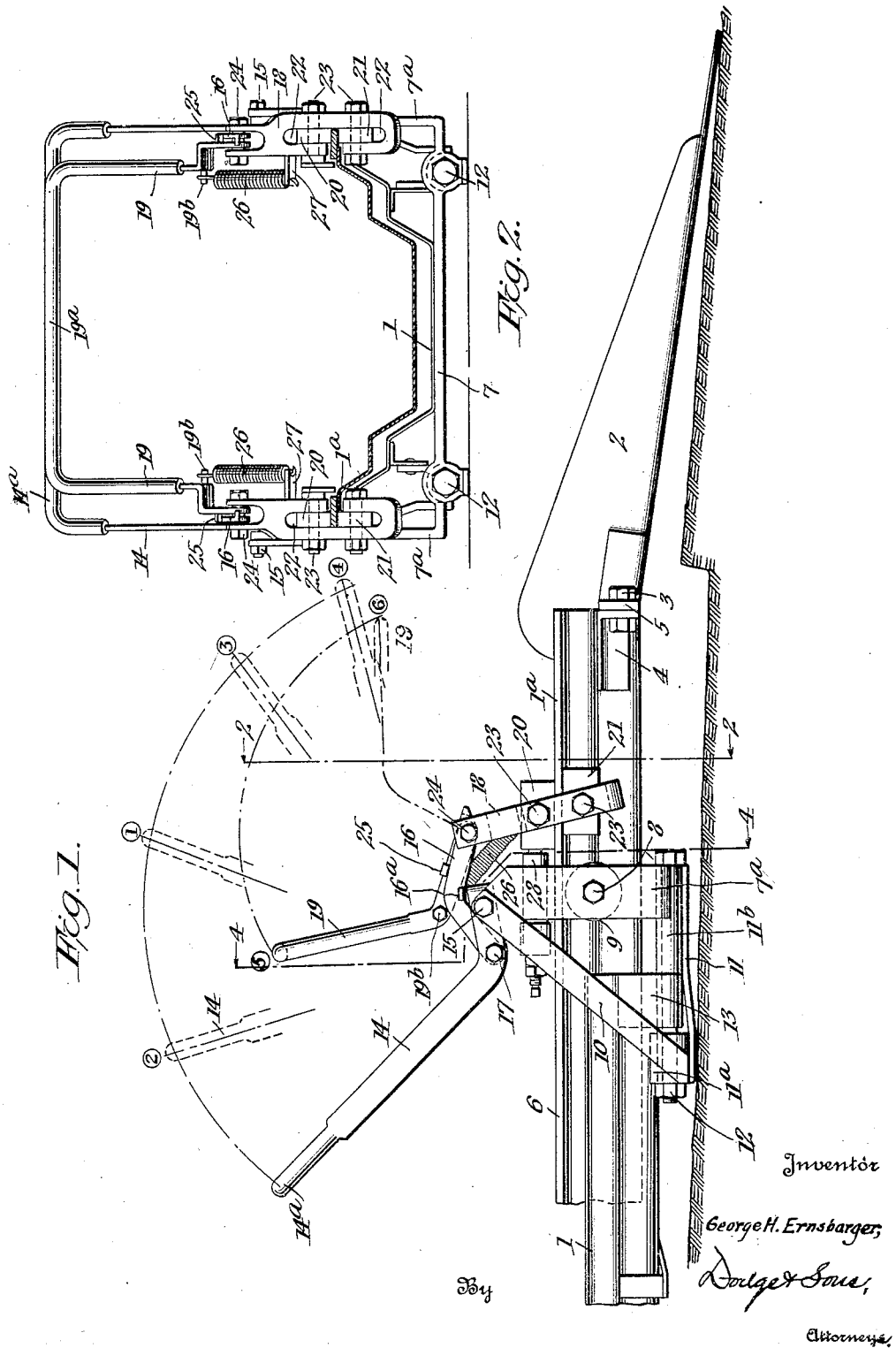
Inventor
George H. Ernsbarger,
By Dodge & Sons,
Attorneys.

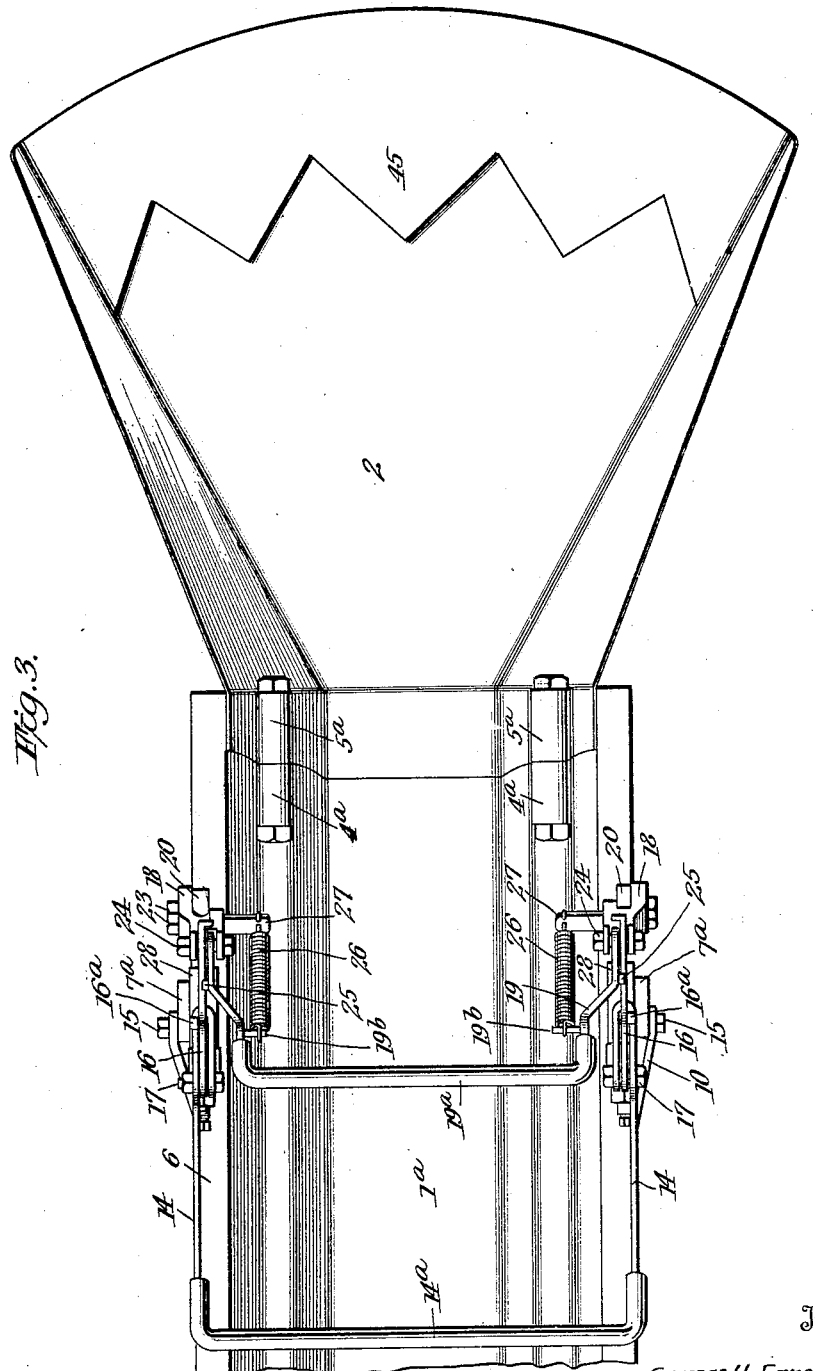

March 22, 1932. G. H. ERNSBARGER 1,850,582
RECIPROCATING OR JIGGING CONVEYER AND LOADER THEREFOR
Original Filed Feb. 15, 1928 5 Sheets-Sheet 3

Inventor:
George H. Ernsbarger,
By Dodge & Sons,
Attorneys.

March 22, 1932.  G. H. ERNSBARGER  1,850,582
RECIPROCATING OR JIGGING CONVEYER AND LOADER THEREFOR
Original Filed Feb. 15, 1928   5 Sheets-Sheet 4
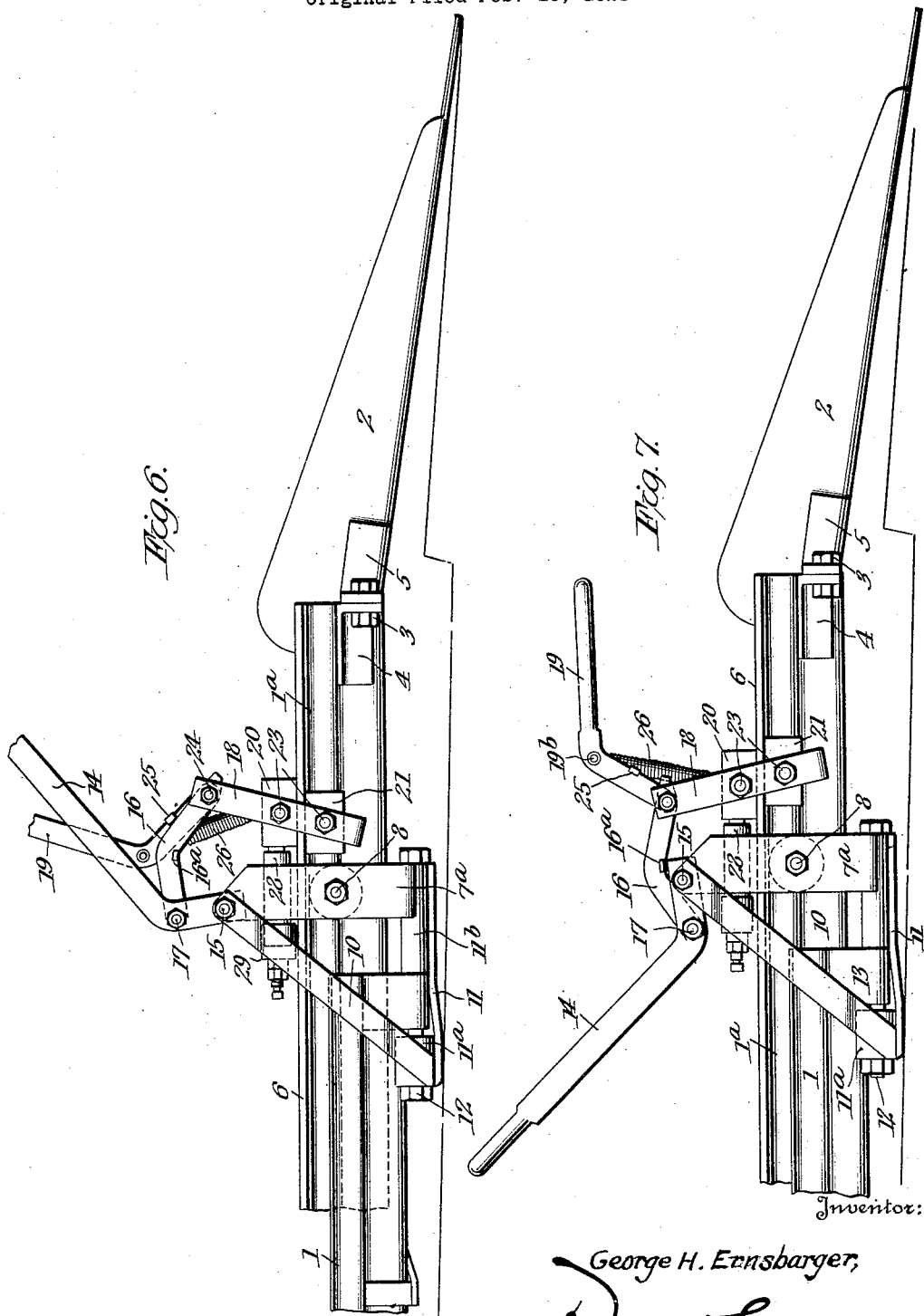
Inventor:
George H. Ernsbarger,
By Dodge&Sons,
Attorneys March 22, 1932. G. H. ERNSBARGER 1,850,582
RECIPROCATING OR JIGGING CONVEYER AND LOADER THEREFOR
Original Filed Feb. 15, 1928 5 Sheets-Sheet 5
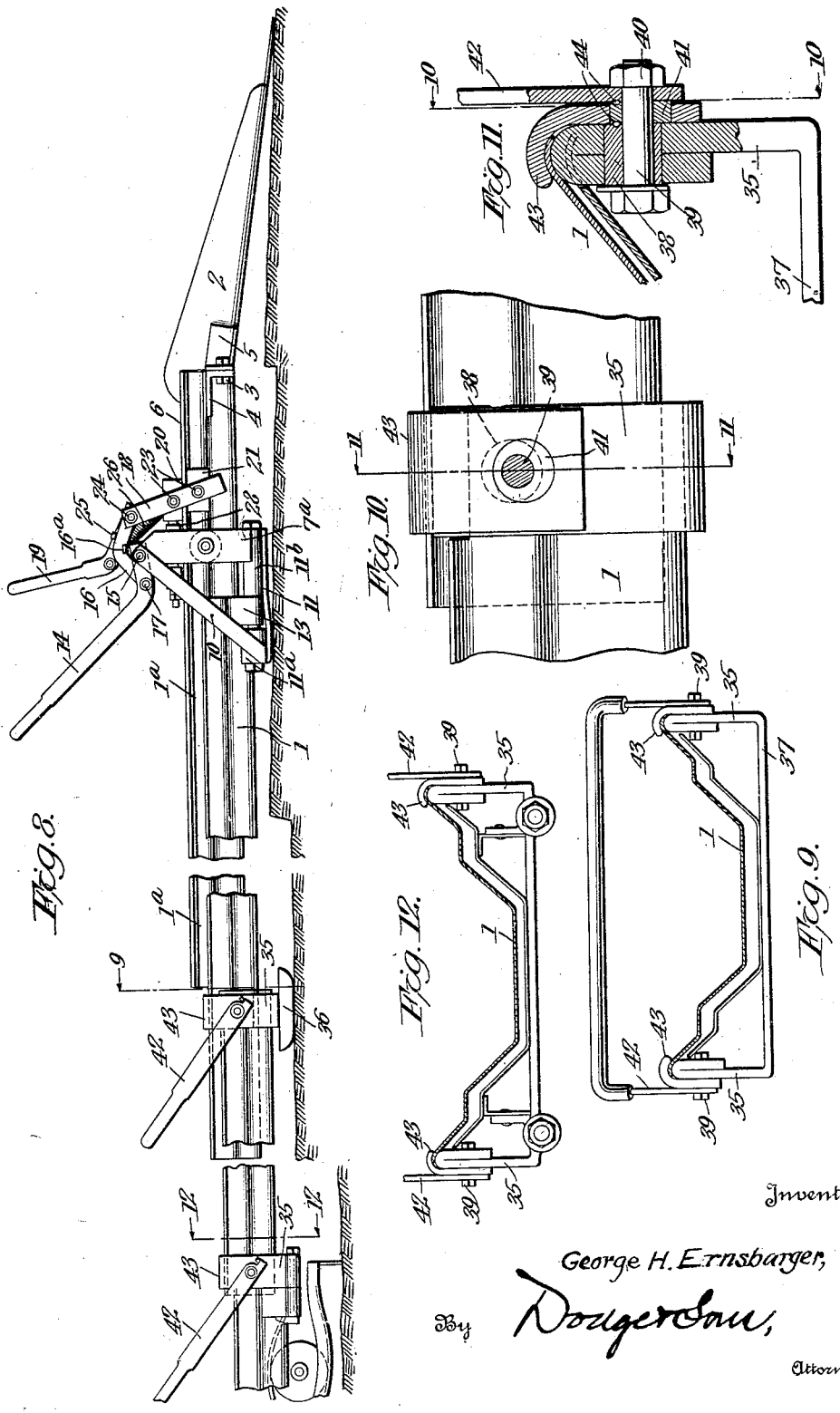
Inventor:
George H. Ernsbarger,
By Dougerdau,
Attorneys.

Patented Mar. 22, 1932

1,850,582

UNITED STATES PATENT OFFICE

GEORGE H. ERNSBARGER, OF HUNTINGTON PARK, CALIFORNIA, ASSIGNOR, BY MESNE ASSIGNMENTS, TO GOODMAN MANUFACTURING COMPANY, OF CHICAGO, ILLINOIS, A CORPORATION OF ILLINOIS

RECIPROCATING OR JIGGING CONVEYER AND LOADER THEREFOR

Application filed February 15, 1928, Serial No. 254,486. Renewed May 21, 1931.

This invention pertains to conveyers suitable for handling coal, ores, sand, gravel, and other commodities, and more particularly, to that type of conveyers now commonly known as reciprocating or jigging conveyers.

Conveyers of this class comprise a trough supported or suspended in any convenient way and longitudinally reciprocated, preferably with accelerating speed near the end of its movement in the transporting direction, so that an impetus or momentum is given to the contents of the trough which causes said contents to continue the forward movement after the forward motion of the trough ceases and the backward movement begins. The trough may be, and usually is, composed of sections bolted or otherwise connected one to another, so that it may be made initially of the desired length, or lengthened or shortened as required, through introduction or removal of a section or sections. The trough is in some cases arranged to rise during its movement in transporting direction, and then to drop away from its contents, permitting the latter to continue its forward movement by reason of its momentum and while out of contact with the receding trough. The receiving or loading end of the trough is in practice provided with a wide mouthed, inclined shovel or scoop, now commonly known as a "duckbill", the forward edge of which lies upon or close to the floor of the mine or other place in which the conveyer is employed. This shovel or duckbill is preferably widened toward its receiving end so as to pass beneath a considerable quantity of material to be transported, the narrowing of said member as it approaches the point of connection with the trough serving to direct the material gathered by the shovel into the relatively narrower trough.

The present invention consists in various details and improvements whereby the trough sections are rendered capable of telescoping one with another to approximately the length of a section, so that the trough may be shortened or extended to render it suitable for use for a comparatively short or long travel of the product handled, or to accommodate it to spaces of different extent without removing or adding sections thereto. To this end the trough sections are arranged with the discharge or delivery end of each overlapping the proximate end of the next section, so that the material handled or conveyed may ride readily off one and onto another section; and clamping and releasing means are provided whereby any section may be instantly connected with or freed from a companion section. These clamping devices, carried by one trough section, are capable of clamping an adjoining trough section so firmly as to prevent accidental movement or slippage of one section relatively to the other, and are further capable of instantly releasing their hold to avoid injury in case of sudden arrest of either section. Such clamping and releasing is effected regardless of the extent to which the parts are at the time telescoped, and may be performed both while the trough is being reciprocated and while it is at rest.

Under the improved construction, that section of the conveyer to which the loading section is attached is equipped with clamping devices to act upon and grip a suitable part of the loading section, to hold it in fixed relation to and to cause it to reciprocate with the jigging trough; to move it outward or away from the terminal section of the trough; to move it in the reverse direction and cause it to telescope therewith to a greater extent than previously; and to perform these several functions while the main trough or conveyer is reciprocating or is at rest, as desired. By suitably manipulating the clamping devices the movement of the shovel or duckbill section may be effected in either direction through force exerted by the attendant. By a different setting of the actuating member of the clamping devices, the duckbill or shovel may be alternately clamped to and unclamped from the reciprocating trough, so that by synchronizing the clamping movement with the movement of the reciprocating trough in the direction in which it is desired to relatively move the shovel section, and reversing the actuating member during the opposite movement of the reciprocating trough, the shovel section may be carried outward or away from the reciprocating or conveyer trough, or moved toward the same as desired.

It is customary in this class of conveyers to connect the shovel or duckbill section with the proximate section of the trough by a swivel joint having a vertical axis, so that the shovel section may be thrown from its normal position to the right or the left side, to permit it to act upon or to gather material over, a wider front, and it is to be understood that the use of such swivel connection is contemplated with the apparatus herein set forth. This is not a feature of the present invention and it is therefore deemed unnecessary to illustrate the same herein.

Figure 5:
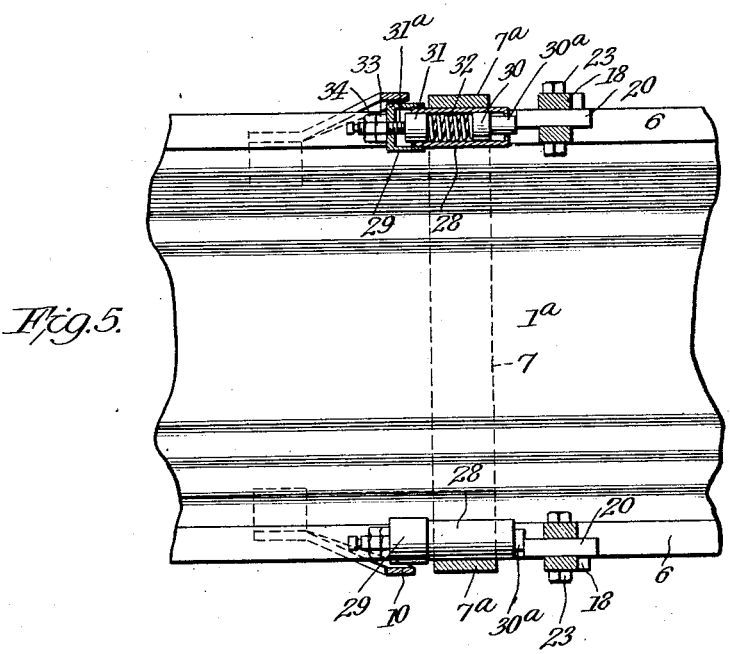

A preferred embodiment of the construction above outlined is illustrated in the accompanying drawings, in which:

Fig. 1 is a side elevation of the shovel or duckbill and a portion of a conveyer or trough section as the parts appear when the shovel or duckbill is secured to the conveyer trough;

Fig. 2, a transverse vertical sectional view of said parts taken on the line 2—2 of Fig. 1, looking in the direction of the arrows;

Fig. 3, a top plan view of the parts shown in elevation in Fig. 1;

Fig. 4, a transverse vertical section on the line 4—4 of Fig. 1, looking from the receiving or shovel end of the conveyer;

Fig. 5, a partly sectional plan view illustrating, primarily, a buffer or yielding device by which injury to the apparatus is prevented in the event of stoppage of the shovel section before the conveyer trough completes its loading or thrust movement toward the material to be conveyed, and whereby also said section is caused to resume its normal position relative to the reciprocating trough or conveyer as the latter reverses its direction of movement;

Figs. 6 and 7, side elevations similar to Fig. 1 but showing the manipulating and control levers of the clamping mechanism in different positions which they occupy under varying conditions of use;

Fig. 8, a view similar to Figs. 1, 6 and 7 but extended to show several trough sections, each partly broken away, and means for telescoping the sections to shorten or lengthen the trough as required and for securely clamping or binding them in their adjusted relations;

Fig. 9, a vertical transverse section taken on the line 9—9 of Fig. 8, showing the manner of clamping the trough sections when properly adjusted;

Fig. 10, an enlarged side elevation on the line 10—10 of Fig. 11 of the parts shown in Fig. 9, with the exception of the actuating lever;

Fig. 11, a vertical sectional view on the line 11—11 of Fig. 10, of the mechanism for binding or clamping together the trough sections;

Fig. 12, a vertical transverse section on the line 12—12 of Fig. 8.

Referring first more particularly to Figs. 1 and 8, the numerals 1 and 1$^a$ indicate trough sections of which there may be any suitable number, the section 1$^a$ being the shovel-carrying section. The shovel 2 may conveniently be attached to section 1$^a$ by bolts 3 passing through angle members 4 and 5 carried respectively on the outside of trough section 1$^a$ and of shovel 2, and by similar bolts 3$^a$ passing through blocks 4$^a$ and 5$^a$ secured to the inner faces of said members 1$^a$ and 2. Any analogous mode of attachment permitting ready removal and replacement of the shovel may be employed. The trough sections 1 are raised and held somewhat above the floor of the mine or other surface over which the trough is carried, as is indicated in Figs. 1 and 8, and the shovel 2 is inclined downward from the trough member 1$^a$, so that its receiving end rests upon or travels close to such floor in order to pass beneath the coal, rock, or other commodity to be transported.

The trough sections 1 and 1$^a$ are preferably of the form illustrated in Figs. 2, 4, 9 and 12, so that they may lie or be carried one within another in their overlapping portions but have clearance sufficient to avoid frictional contact between them. The shovel-bearing section 1$^a$ of the trough is provided with longitudinal bars or plates 6 extending from end to end, and welded, riveted, or otherwise made fast to the outwardly turned longitudinal edges of said trough member. These bars strengthen the shovel-carrying section of the trough, and afford a clamping member to be gripped or clamped between friction blocks later to be described. The bars 6 extend throughout the length of said section 1$^a$, thus permitting the clamping to be effected at any point in the length thereof, and allowing the shovel member to be adjusted longitudinally relative to the proximate section 1, as required.

The section of trough 1 with which section 1$^a$ is immediately associated and to which the latter is clamped when the conveyer is operating, is furnished at its end nearest the shovel 2 with a heavy metal bar 7 extending beneath the trough section 1, its midlength portion resting against the under side of said trough section, and preferably riveted, bolted, or otherwise made fast thereto, while its end portions are bent and extended upward at substantially a right angle to the mid-portion, to form upright standards 7$^a$ passing close to and rising above the bars or plates 6, as seen in Figs. 3 to 8. Turning upon stud axles 8 carried by the uprights 7$^a$ are wheels or rollers 9, upon which rest the bars or plates 6 of the trough section 1$^a$ which is thereby afforded a rolling support over which said trough section may move with a minimum of friction, thus permitting it to be advanced and receded relative to the proximate section of trough 1 upon the application of comparatively slight force. Each standard 7ª is braced by a diagonally arranged bar 10, the foot or lower end of which is made fast by electric welding or otherwise to a block 11ª formed upon or secured to a shoe 11 which carries also a second block 11ᵇ, as seen in Figs. 1, 6, 7 and 8. Each block 11ª and 11ᵇ is provided with a longitudinal hole extending throughout its length and serving to receive a bolt 12 which, extending through said blocks and through a standard pan lug 13 carried by the connected trough section 1, serves to secure shoe 11 and attached parts to the trough section 1 in proper relation to said trough section and to the shovel-carrying section 1ª. The blocks 11ᵇ are seated in bends or recesses formed in the under side of cross bar 7, as best shown in Fig. 4, and are preferably spot welded or otherwise secured in said seats.

This construction gives firm and rigid support for the uprights 7ª and diagonal brace 10, which with the shoe 11 produce a strong and well braced support for clamp-actuating devices now to be described. 14 designates a two-armed or bail-shaped lever which may conveniently be fulcrumed on the bolts 15 which connect the upper ends of diagonal braces 10 with the standards 7ª, though separate pivots may be employed if for any reason it seem desirable so to do. The two arms of lever 14 are of L shape and are connected by a cross bar 14ª which serves as a handle for swinging or oscillating the lever as a whole, about its pivot axis, and by reason of its extending from side to side of the trough, permits actuation of said lever from either side of the trough or from any intermediate point. The ends of the arms of lever 14 are bent backward parallel with but spaced a short distance away from the main bodies of said arms, as best seen in Figs. 3 and 4, each to receive in the intervening space a link 16. Each link is pivotally attached to an arm of lever 14 by a bolt 17 passing through the body of said arm, the link, and the backwardly turned end of the arm. This arrangement gives support for the bolt on both sides of the links 16, thus holding the bolt in proper perpendicular relation to the lever arms and maintaining the link in proper vertical plane.

The end of each link 16 opposite that through which bolt 17 passes is pivotally connected to the upper end of a swinging friction block-carrier 18 of the form best shown in Fig. 2, said carrier being bifurcated at its upper extremity to receive between its two arms the end of one or the other of the links 16 and the arms of a second bail-shaped lever 19 having between its two arms a connecting cross bar 19ª similar to cross bar 14ª of lever 14 and for a like purpose. Each link 16 is shown as provided at about its midlength with an outwardly projecting lug 16ª, forming a stop to limit the descent of the links in the event of accidental removal of either of the end supporting pivot-bolts 17, the lug 16ª overhanging the inner ends of the arms of lever 14, as shown.

Block-carrier 18 carries two gripping or friction blocks 20 and 21, the block 20 lying upon and the block 21 lying below the longitudinal bar or plate 6 of shovel-carrying section 1ª as seen in Figs. 1, 6, 7 and 8. Each block 20, 21 is pivotally supported in the longitudinal opening 22 of its carrier 18 by a bolt 23 passing through the block and through the side walls of said opening, thus giving adequate support and guidance to the blocks and support to the pivot bolts. Similarly, the end of link 16 opposite that attached to lever 14 is pivotally connected to block-carrier 18 by a bolt 24 passing through the walls of the bifurcated upper end of said carrier and through the link. When the block-carrier 18 is in a substantially vertical position the upper block 20 will rest upon, and the block 21 will fall slightly away from, said bar or plate 6, and as the weight of the block-carrier 18 is thus brought upon block 20 through its pivot bolt, said block 20 will be caused by friction to remain at rest during oscillation of lever 14 and consequent oscillation of carrier 18, while block 21 will be moved to carry its pivot bolt to one or the other side of the vertical plane in which the pivot bolt of the upper block 20 at the time stands.

According, therefore, to the direction in which lever 14 is oscillated and to the extent of such oscillation, the blocks 20 and 21 will more or less firmly grip or clamp between them the bar or plate 6. As the block-carrier 18 is swung in one or the other direction about the pivot-bolt 23 of upper block 20, said blocks 20 and 21 will tend to grip the bar or plate 6 more firmly in that direction in which said upper block stands in advance of or overhangs the lower block. Conversely, the gripping or clamping action of the blocks will, unless the block-carrier be locked or manually held and retained in position, tend to lessen if the trough carrying the clamping devices be moved in the direction in which the lower block 21 is advanced beyond the upper block 20. For this reason the relative positions of the pivot-bolts 15 of lever 14 and of pivot-bolts 17 and 24 connecting opposite ends of links 16 with the arms of lever 14 and with block-carriers 18, respectively, are such that when lever 14 is thrown as far to the left as it can go, the centers of bolts 17 and 24 shall be brought into line with the center of pivot-bolt 15, or shall pass slightly below or beyond said line, thereby locking lever 14 against accidental movement and holding block-carrier 18 in the position indicated in Figs. 1 and 8. In this position blocks 20 and 21 will clamp bar or plate 6 firmly between them, and ensure the movement of the shovel-carrying section 1$^a$ with the proximate section of trough 1 until lever 14 is lifted to carry pivot-bolt 17 above a straight line passing through the centers of bolts 15 and 24. Figs. 1, 7 and 8 hence show lever 14 in the position which it normally occupies while the shovel-carrying section 1$^a$ is firmly clamped to the proximate trough or conveyer section, and during reciprocation of the shovel-carrying section with the trough or conveyer.

Further to ensure the retention of the clamping pressure, and to guard against rise of lever 14 through vibration of the connected sections 1 and 1$^a$, the outer side of each arm of lever 19 is provided with a lug or projection 25 which overhangs and bears upon link 16 when lever 19 occupies the position shown in Figs. 1 and 8. Each arm of lever 19 also has connected to it at the point 19$^b$, one end of a helical spring 26, the other end of which is attached to an arm 27 projecting inward from the block-carrier 18 as best seen in Figs. 2 and 3, said spring showing also in Figs. 1, 6, 7 and 8. The point of attachment of springs 26 to the arms of lever 19 is at some distance from the pivot-bolts 24 on which said lever 19 is fulcrumed; hence the springs 26, being under tension, draw said lever arms downward and cause the lugs 25 to press somewhat firmly upon the links 16, which in turn hold lever 14 against upward or unlocking movement. The springs 26 further serve to hold lever 19 in the position indicated in Fig. 7, a position which the lever is given under conditions later to be pointed out, and which causes the point of attachment of spring 26 to the arms of lever 19 to be carried to the right beyond a line passing through its fulcrum or pivot-bolt 24 and the pivot-bolt 23 of block 20.

The primary function of lever 19 is to swing the block-carriers 18 about the pivots 23 of blocks 20 so as to carry the upper end of the block-carrier to the right or to the left, and the lower end in the reverse direction, relatively to the vertical plane in which the pivot of block 20 at the time stands, and thus to reverse the gripping action of said blocks 20 and 21, causing them to grip on movement of trough section 1 to the right and release on the reverse motion, or to grip on movement of said trough section to the left and release on movement thereof to the right.

As best shown in Figs. 2 and 3, the extremities of links 16 just beyond their pivotal connection with block-carrier 18, are bent laterally so as to stand in the path of the arms of lever 19, and thus to limit the swing of said lever 19 toward the shovel 2, and downward.

When lever 14 is in its normal position and locked therein in the manner above described, the clamping blocks 20 and 21 grip plate or bar 6 so firmly that slippage is precluded, and this is deemed important since such slippage would permit gradual extension or contraction, according to adjustment of reversing lever 19, of the conveyer considered in its entirety or as comprising the reciprocating conveyer trough and the shovel or loading section.

On the other hand, it is desirable that, if the shovel meet with any obstruction which would otherwise suddenly arrest its movement and thus endanger the structure, the conveyer trough be freed to continue its reciprocating movement despite the stoppage of the shovel section, and without injury to the apparatus.

It is further desirable to provide means whereby the loading section may be unclamped from the reciprocating trough or conveyer 1 during a succession of movements of trough 1 in a direction away from the loading or shovel section, and re-engaged on successive movements of the trough or conveyer 1 toward said shovel or loading section, to carry the shovel a proper distance beneath or into the material to be moved. This action, when desirable, may be continued until the loading section is moved entirely clear of the conveyer or trough section, to permit removal or introduction of a section between the conveyer and the loader.

Again it may become necessary at times to move the loading section toward, and to further telescope it with, the conveyer or trough section 1, to permit the shovel to be swung laterally to avoid an obstruction, or to work upon a different portion of the front line of the material to be moved.

Under the first of said adjustments (that in which the conveyer trough and the loading or shovel section are connected so as to move in unison in both directions), the shovel will be advanced at each stroke a distance equal to the throw of the jigging or reciprocating motor or engine, and if a large or deep mass of loose material is being operated upon, the shovel will receive at each such advance an adequate supply of such material. This material will be carried upward over the shovel, delivered into the trough or conveyer, and advanced thereby to the delivery end of the conveyer, so long as said conveyer and the loading section are conjointly reciprocated and the material continues to fall or flow to and upon the shovel.

If with the parts adjusted as in Figs. 1 and 8, where the levers 14 and 19 are both thrown to their limit of movement leftward, the forward or entering edge of shovel 2 be suddenly arrested, both of said levers by reason of their considerable weight above their pivotal points, will tend to swing upward and forward owing to the cross bar or bail portion of each lever being quite heavy and rising materially above the respective pivots of said levers. This movement is of course resisted by the links 16 and the pressure of lugs 25 of the arms of lever 19, drawn down upon links 16 by the springs 26. However, unless said springs are under considerable tension and quite strong, the levers, in the event of sudden stoppage of the shovel, could be caused to swing forward sufficiently to bring the block-carriers 18 to a substantially vertical position, in which they would free the grip of the blocks 20 and 21 on bar or plate 6, thus permitting conveyer or trough section 1, with the entire gripping mechanism and its supports, to continue its advance while the loading section remained at rest.

While I prefer to provide other and special means for effecting such release, or for cooperating with the stated possible action of levers 14 and 19, it is obvious that the location of the pivots, the proper weighting of the levers, and the strength or pull of the springs, may be so related as dependably to effect the release of clamping blocks 20 and 21 in the event of sudden stoppage of the shovel. As, however, it is desirable to make the releasing action of blocks 20 and 21 certain and prompt, and to absorb the shock incident to sudden arrest of the shovel, there is made fast to each upright standard 7ª in any suitable manner, a horizontal tubular shell or casing 28 provided with a cap 29 preferably threaded to screw upon the correspondingly threaded end of the shell, as best shown in Fig. 5 but seen also in Figs. 1, 4, 7 and 8. The cap and the opposite end of the shell are each provided with a central opening, the one at the end remote from the cap, to receive and guide the stem 30ª of a cylindrical plunger or piston 30 between which and a similar plunger or piston 31 is interposed a suitable cushion 32. A threaded stem or screw 31ª passes through the central opening of cap 29, which is tapped to receive said stem, and bears at its inner end against the plunger or piston 31. The outer extremity of stem 31ª is made polygonal or is otherwise fashioned, to receive a wrench or other implement by which to turn it to increase or diminish the initial or normal compression of the cushion. To prevent the accidental turning or loosening of screw or stem 31ª, a nut 33 and jam-nut 34 are provided as shown in Fig. 5. The nut 33 screws tightly against the cap 29, and nut 34 screws against the nut 33, thus doubly guarding against the loosening of stem 31ª and ensuring maintenance of the predetermined and proper normal or initial compression of cushion 32. In Fig. 5 the cushion 32 is shown in the form of a helical spring, for which, however, any equivalent cushion may be substituted. In practice, a rubber cushion has been found somewhat more satisfactory, since it is not liable to break, and maintains its resilience over a long period of use. An air cushion is of course practicable but requires more careful fitting and finishing of parts. A combined helical spring and rubber cushion similar to that used in railway car trucks is likewise available. Any common or well-known type of spring or cushion may, however, be employed.

The foregoing description applies to both of the buffer devices, of which there is one at either side of trough section 1, as best seen in Figs. 4 and 5.

The stem 30ª of plunger or piston 30 is caused by spring 32 normally to protrude somewhat beyond the end of shell 28, the body of the piston when its stem is unobstructed, resting with its face in contact with the end wall of shell 28 and the stem 31ª projecting practically its entire length beyond said shell. In Fig. 5, however, the outer end of stem 30ª is shown in contact with upper gripping block 20, the advance of piston 30 and its stem having been arrested by said block, and spring 32 being shown compressed to a degree in excess of that existing when the plunger 30 is moved outward to its extreme limit. The adjustment illustrated in Fig. 5 is that which obtains when lever 14 is thrown to the extreme left or to locking position, at which time the outer end of stem 30ª bears against the gripping block 20.

Assuming the positions of the parts shown in Fig. 5 to be that which they occupy when lever 14 is locked in the position shown in Figs. 1 and 8, it will be seen that if shovel-carrying section 1ª be suddenly arrested in its movement toward the material to be loaded, trough section 1 which carries shell 28 may advance a distance equal to the protrusion of stem 30ª of plunger 30, and this distance may of course be made greater or less by employing shells 28 of greater or lesser length, and equipping them with springs suited to the length thereof. If through such sudden stoppage of the loading section, lever 14 be thrown slightly upward through the momentum acquired by its advance with trough section 1, said lever will be unlocked, and the stem 30ª of plunger 30, made free by the unlocking of lever 14, will press against clamp-blocks 20 and co-operate with links 16 to swing carriers 18 to a vertical or releasing position, thus permitting trough section 1 further to continue its movement toward the material to be loaded, while the shovel comes to rest.

Should the lever 14 remain locked when the forward movement of the shovel is abruptly arrested, the links 16 moving forward with trough section 1 and acting upon the upper ends of block-carriers 18 at that moment clamped to bar or plate 6, will swing said carriers about their pivot bolts 23 to an upright position, thus releasing the grip of blocks 20, 21 on bar or plate 6. Lever 14 can then be raised to break the lock incident to the position of links 16, thereby leaving the conveyer or trough 1 free to reciprocate without reclamping of bar or plate 6 by the blocks 20 and 21, pending the stoppage of the engine or motor by which the conveyer is reciprocated.

To effect alternate unclamping of the loading section from trough or conveyer 1 during successive movements of said conveyer in a direction away from the material to be loaded or from the loading section, and re-engagement thereof on successive reverse movements of the trough or conveyer 1, the lever 19 is placed in the position indicated in Fig. 1 by the numeral 5, numerals 1, 2, 3, 4, 5 and 6 being enclosed in a circle to prevent confusion with the other numerals. The movement of lever 19 to position 5 is made preparatory to the step-by-step movement of the loading section toward the mass of material to be taken up by said loading section and delivered to the trough. The effect of throwing lever 19 to position 5 is to hold blocks 20 against the end of plunger 30$^a$.

If, now, lever 14 be raised to the position designated by the encircled numeral 2 in the path of said lever (see Fig. 1), pivot-bolt 17 connecting links 16 with lever 14 will be raised so as to lift the connected ends of said links and break the toggle lock previously existing, and if the movement of lever 14 be continued further to the position indicated by the encircled numeral 1 in the path of said lever, the block-carriers 18 will be swung to position to free plate or bar 6 from the grip of blocks 20, 21. Hence by swinging lever 14 to position 2 and holding it in such position during the movement of conveyer or trough 1 toward the loading section, the shovel will be caused to advance, and upon moving lever 14 from said position 2 to position 1, blocks 20, 21 will be caused to unclamp bar or plate 6 of the loading section, and to permit the trough or conveyer 1 to move away from said loading section while the latter remains at rest. By synchronizing these movements with the reciprocations of conveyer or trough 1, and causing the alternate gripping and release to occur at the commencement of the reciprocating movement, first in one direction and then in the other, the shovel may be advanced as many steps as desired, and the lever 14 then returned to its clamping and locking position.

This action may be repeated if necessary or desirable, until the loading section is moved clear of the conveyer or trough 1, said loading section being then pushed or drawn away a distance sufficient to permit a new trough section to be introduced. This permits a section to be added to or removed from trough or conveyer 1 as required by working conditions, the loading section being again moved into overlapping or nesting relation to the trough section bearing the clamping mechanism.

When it is desired to withdraw or move the shovel away from the material to be loaded and transported, and to telescope it further into section 1 of the conveyer, lever 14 is raised to the position indicated by the encircled numeral 1 in Fig. 1, thereby moving carrier-blocks 18 through the intermediate links 16, to an upright or unclamping position. The movement of conveyer or trough 1 toward the shovel will then carry the released gripping blocks toward said shovel without effect thereon. The movement of the trough or conveyer 1 toward the shovel being completed, lever 14 is thrown from position 1 to position 2, Fig. 1, thereby reclamping blocks 20, 21 on the bar or plate 6, and causing the shovel section to be drawn with the trough away from the mass of material to be loaded. Lever 14 is then again swung to the releasing position at 1, permitting the conveyer or trough to make a second movement toward the shovel while the latter stands at rest, and so on. In this way the shovel or loading section may be backed off from the material to be loaded, and telescoped within trough section 1 in one or more movements, to the desired extent, through the force supplied by the reciprocating trough. When this point is reached, lever 14 is thrown down to locking position, thereby rigidly clamping the loading section to the conveyer or trough section and causing the two to reciprocate as one.

When it is desired to move the shovel or loading section 1$^a$ manually outward from the conveyer or trough section 1, lever 14 is swung forward or toward the shovel to the position in which it is shown in Fig. 6 and indicated in Fig. 1 by the encircled numeral 3, thereby swinging block-carriers 18 to the position shown in Fig. 6 by reason of the intermediate links 16 connecting the lever 14 and the block-carriers 18. In this position of lever 14 and block-carriers 18, blocks 20 and 21 firmly clamp bar or plate 6, and the springs 26 tend to retain the block-carriers in the position indicated in Fig. 6. If, now, lever 14 be moved further to the right, down to position 4 as indicated in Fig. 1, the force applied to said lever will tend to straighten out the toggle formed by links 16 and the short arms of the lever 14, and through pressure of the links against the block-carriers 18, will move the loading or shovel section 1$^a$ outward relatively to the trough or conveyer 1. By manually oscillating lever 14 between positions 3 and 4, this step-by-step movement of the trough may be continued so long as the bar or plate 6 remains between the clamping blocks 20 and 21.

To manually withdraw loading section 1ª from the material to be loaded or transported, lever 19 is thrown to the position it occupies in Fig. 7 and to the point indicated by the encircled numeral 6 in Fig. 1. This causes the block-carriers 18 to be thrown back from the position shown in Fig. 6 to that shown in Figs. 1, 7 and 8, reversing the relative positions of clamping blocks 20 and 21 from that shown in Fig. 6. In this position of lever 19, springs 26 tend to hold the block-carriers 18 in the position indicated in Fig. 7, since the pivot 24 of lever 19 is to the left of and out of line with, a line passing through point 19ᵇ and pivot-bolt 23 of clamping blocks 20. Lever 14 is next swung from its locked position to position 1 of Fig. 1, thereby causing lever 19, block-carriers 18 and blocks 20, 21 to move along bar or plate 6 toward shovel 2, the grip of said blocks having been released in the act of moving lever 14 from locked position to position 1. If, now, said lever 14 be swung leftward to position 2, blocks 20 and 21 will be caused to grip bar or plate 6 of loading section 1ª, and to draw said section backward through the medium of links 16. This operation may be repeated until the shovel is sufficiently withdrawn from the mass of material to be transported, whereupon lever 14 will be swung down to its normal locked position, thus causing the firm clamping of bar or plate 6 by blocks 20, 21, and locking the clamping mechanism in the position indicated in Figs. 1 and 8.

Mention has been made herein of the telescoping of the sections of the trough or conveyer, and this is desirable, to the end that the length of the trough may, without adding to or taking from the number of sections composing it, be adapted for use between loading and discharging points more or less widely separated. With this object in view the trough sections are nested with and overlap one another after the manner of trough section 1 and loading section 1ª, as best seen in Figs. 2, 9 and 12. As here shown the sections of the conveyer or trough proper are not provided with the bar or plate 6, the longitudinal edges of said trough sections being fashioned as indicated in Figs. 9, 10, 11 and 12; that is to say, they are curved in cross section as best seen in Figs. 11 and 12. Each trough section is supported at its end toward or nearest to the shovel, by a post 35 (Fig. 8), carrying at its lower end a shoe 36 of any convenient form or type, and having its upper end rounded as in Figs. 9 to 12, to fit beneath and give a good bearing support for the curved edge of a trough section. The posts 35 are preferably of metal and may be conveniently formed by bending upward at a right angle to its body, the end portions of a heavy flat metal bar 37, the rounded upper bearing face of said posts being formed by bending over the upper extremities of the posts 35 until they lie parallel with and bear directly against the flat faces of said posts, as seen in Fig. 11.

This construction affords a very rigid post and provides sufficient thickness of metal in its upper portion to receive a cylindrical block 38, which is nicely seated but free to turn in, a hole formed in the thickened or folded end of the post. The cylindrical block 38 is bored in the direction of its axis but eccentrically thereto, to receive a substantial bolt 39 headed at one end and threaded at its opposite end to receive a nut 40. Bolt 39 is of sufficient length not only to pass through block 38 from end to end, but to pass also through a circular disk 41 of the same or about the same diameter as said block, and thence through a bar or lever 42, both interposed between block 38 and the nut 40. 43 designates a clamping jaw or hook, the upper end of which is curved to conform to the curvature of the rim of trough section 1, as shown in Fig. 11, while its lower end is bored to receive and afford a bearing for disk 41. The measurements of block 38, disk 41, and bar or lever 42 in the direction of the axis of bolt 39 are slightly in excess of the aggregate measurement of the folded upper end of post 35 and clamp member 43, so that by turning nut 40 tightly up against lever 42, said lever, disk, and block 38 shall be pressed facewise, and held in such close and firm contact that they shall move as one, but that block 38 and disk 41 shall be free to rotate, and clamping member or hook 43 shall be free to rise and fall, or in other words, shall not be clamped in binding contact with post 35 or bar 42. The clearance provided for such movement of the composite or double eccentric and the clamping member should not be great, but should be adequate to ensure free and unobstructed movement of said parts.

The office of the two eccentric members 38 and 41 is to raise and lower the clamping jaw or hook 43 a greater or less distance for a given oscillation of lever or bar 42 about the axis of block 38. The purpose of making the eccentric in two separate parts is to permit variation in the rise and fall of clamping member 43 for any given oscillation of bar or lever 42. It is obvious that the larger and heavier member 38 constitutes the pivot or fulcrum of bar or lever 42 which, with the two members of the eccentric, is clamped rigidly between the head and nut of bolt 39, as already explained, and that this rotates about its own axis when lever 42 is oscillated. The eccentric disk 41, however, imparts motion to the clamping jaw or hook 43, and the movement thus effectd is varied and determined by turning disk 41 about bolt 39 to bring its circumference more nearly into or carry it further out of, registration with that of block 38. To accomplish such adjustment it is necessary only to remove the nut 40, take off lever 42, and turn disk 41 through the required number of degrees to vary its eccentricity to said block to the extent necessary to effect a given rise and fall of clamping member 43 in response to oscillation of lever 42 between two predetermined points. Before replacing the nut 40 and lever 42, but after turning disk 41 to the required position, small balls, blocks or bodies 44 are inserted between the opposing faces of disk 41 and block 38, and between opposed faces of disk 41 and bar or lever 42, these balls or bodies being seated in shallow depressions in such opposed faces. On turning nut 40 back to the position in which block 38, disk 41 and bar or lever 42 are in firm and close contact, the interposed small bodies will be firmly seated in the depressions provided for them, and will effectually preclude relative movement of the several parts.

It is advisable to have in one of each pair of opposed faces a plurality of depressions, so that a depression of each face may be directly opposed to a like depression of an opposed face under every adjustment that need be provided for the disk 41 or for lever 42, or both.

It is manifest that with the troughs overlapping as indicated in Figs. 9 to 12 inclusive, and the rims of one trough interposed between the upright posts 35 and clamping jaws or hooks 43 of a companion trough, such interposed edge may be very rigidly clamped and bound between each post and its clamping jaw or hook, by swinging lever 42 in proper direction, and may be immediately released by reversing such lever movement.

Levers 42 may be single straight bar levers as shown in Figs. 11 and 12, or of bail form as indicated in Fig. 9, the bail form being preferred for the reason that it permits simultaneous operation of the clamping jaws at opposite sides of the trough through manipulation of a single element, and enables the attendant to manipulate both clamps from either side of the trough or conveyer, or from any intermediate point.

The shovel 2, as shown in Fig. 3, is reinforced at its forward or entering edge by turning over the metal plate of which it is formed, and folding the same upon the main body of the plate; or the reinforcing plate 45 may be made of a separate piece of metal, welded, riveted, or otherwise secured to the main plate. The inner edge of the reinforcing strip 45 is preferably indented, to afford a longer line of attachment, facilitate the movement of the coal or other product over the edge, and lessen the tendency of such inner edge to be detached or to lift from the main plate. This expedient has been found effective in overcoming a difficulty encountered in the use of an unindented edge. As shown, the shovel is provided with raised sides to prevent lateral escape of the material handled, and to direct the same into the trough $1^a$ of the loading section.

As before indicated, the trough or conveyer may be either suspended, or supported from below, and any usual form of support, as shoes or skids, rollers attached to the trough sections or placed below the same, or loose rolls or wheels interposed between supporting cradles resting upon the ground or floor and upper cradles carried by the trough sections, may be used, all these devices being common and well known in the art.

The apparatus constructed as above set forth has proven very efficient and economical in practical service.

It is of course obvious also that the trough may be provided with the now common lateral outlets and guides or switches for delivering material at points intermediate the ends of the conveyer.

A loading attachment of the construction here set forth may be employed at either end or at both ends of a reciprocating conveyer, so as to take up its load at either end and deliver it at the opposite end, directly upon the ground or floor at the delivery point, or into any suitable receptacle or vehicle, or at an intermediate point.

So, too, it is manifest that the actuating levers and clamping devices here shown and described as mounted on the loading section, may be mounted upon the end of the conveyer trough next the loading section, and arranged to grip or frictionally bind a plate or bar such as 6 on the proximate section of the conveyer trough.

Obviously, the connecting cross bars $14^a$ and $19^a$ of levers 14 and 19 might be omitted, and the two arms of each operated as separate levers, but the bail-like lever form is deemed best.

If the material of which the troughs or the trough section $1^a$ be made be sufficiently heavy, the flanges of the trough or troughs may themselves constitute the longitudinal clamping bars or plates to be gripped by the clamping blocks, a separate or additional bar or plate being provided only in case this be deemed expedient in order to furnish the requisite stiffness and strength. The claims are hence to be read with the understanding that whether the flanges be reinforced by a separate bar or plate or employed without, is a mere detail falling within the judgment of the engineer or constructor, and in no manner or degree affecting the invention sought to be protected.

I claim:

1. In combination with a reciprocable conveyer or trough, a loading section therefor comprising a shovel and a trough member connected one to the other and arranged in telescoping relation to the conveyer, the trough member of the loading section being provided with longitudinal side bars; and lever-actuated clamping mechanism carried by the conveyer and serving when the lever is thrown to given positions and oscillated within predetermined limits, to clamp and unclamp alternately the side bars of the trough member of the loading section.

2. In combination with a reciprocating trough or conveyer, a loading section distinct therefrom, comprising a trough member and a shovel for gathering material to be delivered into the trough; clamping mechanism carried by one of the parts, the conveyer or the loading section, and adapted to bear on opposite faces of and to grip a plate or bar carried by the other of said parts; and a lever for actuating said clamping devices.

3. Apparatus for gathering and conveying loose materials in bulk, comprising a reciprocating trough or conveyer; a loading attachment therefor consisting of a trough section and a shovel to receive and deliver material to the trough section, the trough section of the loading attachment being arranged in telescoping relation with the conveyer trough; and clamping mechanism carried by one of said trough sections and serving to positively grip between two members the side bars of the other trough section to cause the two sections to reciprocate as one.

4. Apparatus for gathering and conveying loose materials in bulk, comprising a reciprocating trough or conveyer; a loading attachment therefor consisting of a trough section and a shovel to receive and deliver material to the trough section, the trough section of the loading attachment being arranged in telescoping relation with the conveyer trough; clamping mechanism carried by one of said trough sections and serving to positively grip the side bars of the other trough section to cause the two sections to reciprocate as one; and a lever which when in one position causes the clamping mechanism to grip the parts when moving in one direction, in another position causes the clamping mechanism to grip when the parts are moving in the opposite direction, and in an intermediate position frees the side bars of the companion trough sections.

5. A loader for use in connection with a jigging conveyer, said loader comprising a trough section and a shovel attached thereto, said trough section having longitudinally extending side bars; a main trough section; and gripping means carried by said main trough section and serving to grip the longitudinal side bars of the loader trough section when moved either way from a medial position, but to release said bars when brought to intermediate position.

6. In a reciprocating conveyer, the combination of a trough provided at one extremity and at both sides with rigid uprights; a lever of bail form, the two arms of which are respectively fulcrumed on the uprights at opposite sides of the trough; links pivotally connected to the two arms of said lever at a distance from the fulcrum axis thereof and extending from said point of attachment over and to a point beyond the fulcrum axis; carriers suspended from the ends of the links opposite those at which the links are connected to the lever arms; and clamping blocks pivotally supported in said carriers and adapted to frictionally grip between them a plate or bar when the carriers are inclined to one or the other side of their intermediate position.

7. In a reciprocating conveyer, the combination of a trough provided at one extremity and at both sides with rigid uprights; a lever of bail form, the two arms of which are respectively fulcrumed on the uprights at opposite sides of the trough; links pivotally connected to the two arms of said lever at a distance from the fulcrum axis thereof and extending from said point of attachment over and to a point beyond the fulcrum axis; carriers suspended from the ends of the links opposite those at which the links are connected to the lever arms; and clamping blocks pivotally supported in said carriers and adapted to frictionally grip between them a plate or bar when the carriers are inclined to one or the other side of their intermediate position, the axes of the lever fulcra and of the pivot-bolts connecting the links to the levers and to the block-carriers respectively being positioned as described, to fall into a common plane when the lever is thrown to a predetermined limit of movement in one direction.

8. In a reciprocating conveyer, the combination of a trough provided at one extremity and on both sides with rigid uprights; a lever of bail form, the two arms of which are respectively fulcrumed on the uprights at opposite sides of the trough; links pivotally connected to the two arms of said lever at a distance from the fulcrum axis thereof and extending from said point of attachment over and to a point beyond the fulcrum axis; carriers suspended from the ends of the links opposite those at which the links are connected to the lever arms; clamping blocks pivotally supported in said carriers and adapted to frictionally grip between them a plate or bar when the carriers are inclined to one or the other side of their intermediate position; and stops for arresting the movement of the links and consequently of the lever, in one direction.

9. In a reciprocating conveyer, the combination of a trough provided at one extremity and on both sides, with rigid uprights; a lever of bail form, the two arms of which are respectively fulcrumed on the uprights at opposite sides of the trough; links pivotally connected to the two arms of said lever at a distance from the fulcrum axis thereof and extending from said point of attachment over and to a point beyond the fulcrum axis; carriers suspended from the ends of the links opposite those at which the links are connected to the lever arms; clamping blocks pivotally supported in said carriers and adapted to grip between them a plate or bar when the carriers are inclined to one or the other side of their intermediate position; a second lever of bail form, the two arms of which are pivotally connected with the upper ends of the block-carriers and are provided with lugs to overhang and bear upon the links; and springs attached at one end to said carriers and at their opposite end to the arms of said second lever at points removed from the fulcra of said lever; whereby the springs are caused under one adjustment of the levers to press said lugs down upon the links and hold them against rising, and when the second lever is thrown to a different position, serving to hold the carriers tilted in a reverse direction from that in which they stand when the lugs of the second lever bear upon the links.

10. In combination with a reciprocating conveyer trough, a loading section comprising a shovel and a trough member provided with laterally projecting side bars; and clamping means carried by the reciprocating trough and serving, when moved in either direction from a mid position, to grip the upper and lower faces of said side bars, but to release the same when swung to intermediate position.

11. In reciprocating loading and conveying apparatus, the combination of a loader including a trough section having longitudinal side bars; a main conveyer trough; and gripping mechanism carried by said main trough and provided with upper and lower gripping faces serving simultaneously to grip the upper and lower faces of the side bars of the loader trough under manipulation of the gripping mechanism.

12. In combination with a reciprocating trough or conveyer equipped with gripping mechanism such as shown and described, and with a loading section the trough member of which has longitudinal laterally extending plates or bars at opposite sides adapted to be gripped by said mechanism, buffers carried by the conveyer section and comprising fixed shells and yieldingly-pressed plungers within said shells, the stems of said plungers protruding from their shells and bearing at their protruding ends against the gripping members above the side bars or plates of the loading section; whereby in the event of sudden stoppage of the loading section said stems, and later the shell, shall force the uprights of the gripping element to a releasing position, the buffers taking up the initial shock and contributing to the movement of the gripping devices to releasing position.

13. A reciprocating conveyer, comprising a main trough section; a gripping mechanism carried thereby and adapted to grip the longitudinal side bars of a telescoping trough section constituting with its shovel, a loader for the trough; and buffers carried by the conveyer trough in alinement with the loader-gripping devices and consisting of hollow shells, plungers contained within said shells and having their stems protruding therefrom and bearing against the gripping devices, springs bearing at one end against said plungers, followers bearing against the opposite ends of the springs, caps secured to said shells at the ends opposite those from which the plungers protrude, and adjusting screws passing through tapped openings in said caps and bearing against the followers; whereby the compression of the springs may be varied as desired.

14. A reciprocating conveyer, comprising a main trough section and a loader section, the latter provided with longitudinal laterally extending bars or plates and arranged in telescoping relation to the main trough section; rollers carried by the main conveyer trough, beneath and serving to support the laterally projecting plates or bars of the trough section of the loader; and means for connecting and disconnecting the main conveyer trough and the trough section of the loader.

15. A trough for a conveyer of the reciprocating or jigging type, comprising a plurality of overlapping, telescoping sections, one or more of said sections being provided at opposite sides with posts projecting above its side flanges or edges and fashioned to fit beneath and support the outer longitudinal edges of the overlapping trough section; clamping hooks or jaws fashioned to overhang the side edges of the overlapping trough so supported; and eccentrics carried by said posts and serving to raise or lower at will the clamping hooks, and thereby to release or to clamp together the two trough sections.

16. A trough for a conveyer of the reciprocating or jigging type, comprising a plurality of overlapping, telescoping sections, one or more of said sections being provided at opposite sides with posts projecting above its side flanges or edges and fashioned to fit beneath and support the outer longitudinal edges of the overlapping trough section; clamping hooks or jaws fashioned to overhang the side edges of the overlapping trough section so supported; eccentrics carried by said posts and serving, when rotated, to raise or lower at will the clamping hooks and thereby to release or to clamp together the two trough sections; and lever arms for rotating said eccentrics.

17. In combination with trough sections of a reciprocable trough conveyer, arranged in overlapping and telescoping relation one to another; posts carried by the underlying trough section, extending above the side edges or flanges thereof to and beneath the under side of the flanges of the overlying trough; clamping hooks or jaws fashioned to engage over the side flanges of the overlying trough section and to bind the same to said posts; a two-part eccentric, one member of which is journaled in the post and the other member of which is seated in a circular opening in the clamping hook and is rotatable about a fixed axis to vary its eccentricity as related to the first-mentioned member; a bolt extending through the two members of the eccentric and serving to bind and hold them in fixed relation at any desired relative adjustment; and means for rotating said two-part eccentric, the axis of the bolt being the axis about which either member of the eccentric may be adjusted to vary the relative eccentricity of said members.

18. A trough for a conveyer of the reciprocating or jigging type as set forth in claim 16, wherein the aggregate axial measurement of each of the two parts of the eccentric exceeds slightly the measurement in the same direction of the part in which it turns; whereby the binding bolt is enabled to clamp and bind firmly the several parts which it carries without producing binding friction upon the parts in which said eccentric turns.

19. A loader for reciprocating or jigging troughs, comprising a trough section and a shovel secured thereto, the forward edge of the shovel member being provided with an overlying reinforcing or stiffening plate, the inner edge of which is provided with a series of indentations.

20. In a reciprocating conveyer, two telescopic troughs, one of which is provided with a support at one side thereon, a horizontal plate rigid with the other trough, a carrier pivotally connected with said support to swing in an upright plane extending longitudinally of said troughs, a pair of gripping members on said carrier positioned above and below said plate and adapted to frictionally engage said plate when said carrier is tilted from an upright position and to release said plate when said carrier is in a more generally upright position relative to said plate.

21. In a reciprocating conveyer, two telescopic troughs, one of which is provided with a support at one side thereof, a horizontal plate rigid with the other trough, a carrier pivotally connected with said support to swing in an upright plane extending longitudinally of said troughs, a pair of gripping members on said carrier positioned above and below said plate and adapted to frictionally engage said plate when said carrier is tilted from an upright position and to release said plate when said carrier is in a more generally upright position relative to said plate, and lever means carried by said support for positively controlling the position of said carrier.

22. In a reciprocating conveyer, two telescopic troughs, one of which is provided with a support at one side thereof, a horizontal plate rigid with the other trough, a carrier pivotally connected with said support to swing in an upright plane extending longitudinally of said troughs, a pair of gripping members on said carrier positioned above and below said plate and adapted to frictionally engage said plate when said carrier is tilted from an upright position and to release said plate when said carrier is in a more generally upright position relative to said plate, stop means carried by said support for restraining movement of one end of said carrier in one direction, and lever means connected to said carrier for tilting said carrier into clamping position against said stop, or for moving into a more upright, released position.

23. In a reciprocating conveyer, two telescopic troughs, one of which is provided with a support at one side thereof, a horizontal plate rigid with the other trough, a carrier pivotally connected with said support to swing in an upright plane extending longitudinally of said troughs, a pair of gripping members on said carrier positioned above and below said plate and adapted to frictionally engage said plate when said carrier is tilted from an upright position and to release said plate when said carrier is in a more generally upright position relative to said plate, stop means carried by said support for restraining movement of one end of said carrier in one direction, and lever means connected to said carrier for tilting said carrier into clamping position against said stop, or for moving into a more upright, released position, and means responsive to excessive resistance of said second named trough to afford yielding movement of said stop in a direction to decrease the clamping angle of said carrier relative to said plate.

24. In a reciprocating conveyer, two telescopic troughs, one of which is provided with a support at one side thereof, a horizontal plate rigid with the other trough, a carrier pivotally connected with said support to swing in an upright plane extending longitudinally of said troughs, a pair of gripping members on said carrier positioned above and below said plate and adapted to frictionally engage said plate when said carrier is tilted from an upright position and to release said plate when said carrier is in a more generally upright position relative to said plate, and means responsive to excessive resistance of said plate for automatically relieving the clamping angle of said carrier, comprising a yielding stop carried by said support and coacting with said lever means for holding said carrier in its tilted, clamping position.

In testimony whereof I have signed my name to this specification.

GEORGE H. ERNSBARGER.